E. THOMPSON.
ICE CREAM FREEZER.
APPLICATION FILED FEB. 27, 1920.
1,381,442.
Patented June 14, 1921.
2 SHEETS—SHEET 1.
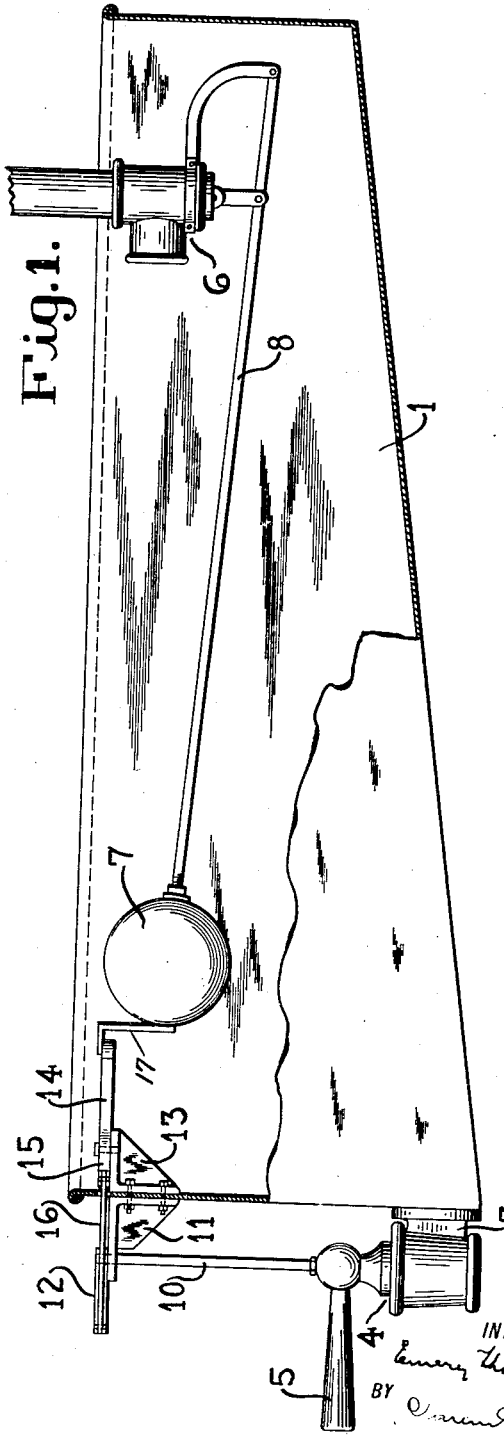
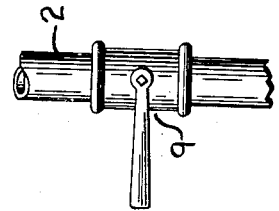
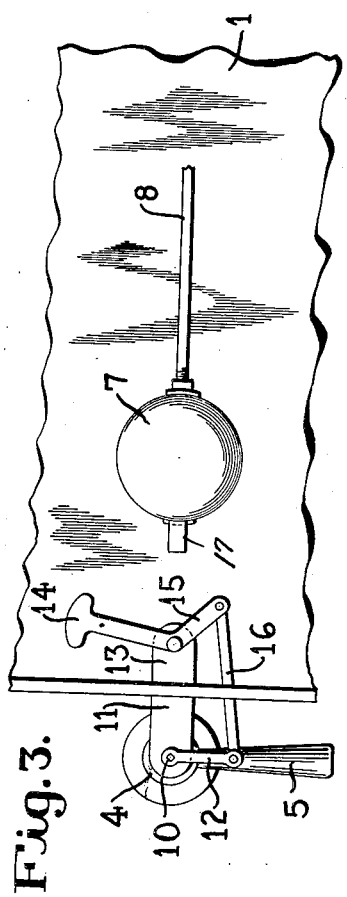
INVENTOR
ATTORNEY

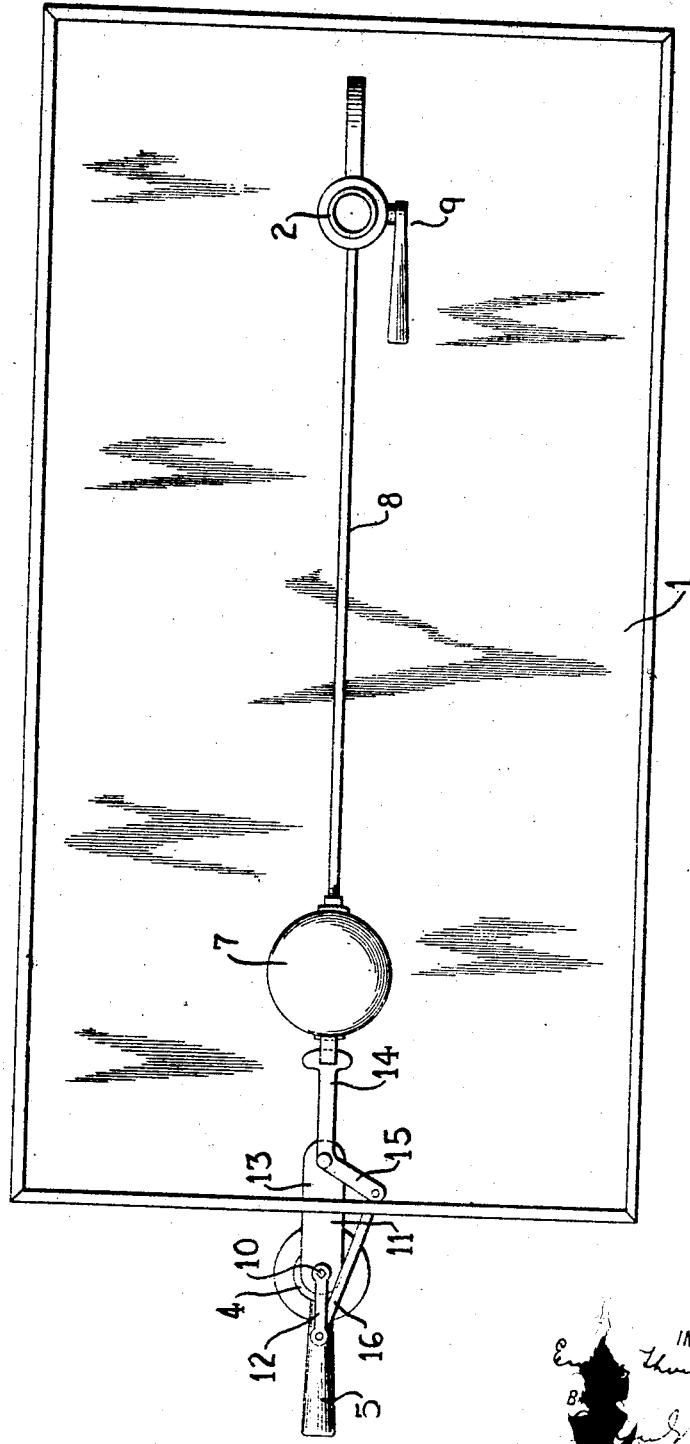

UNITED STATES PATENT OFFICE.

EMERY THOMPSON, OF NEW ROCHELLE, NEW YORK.

ICE-CREAM FREEZER.

1,381,442.  Specification of Letters Patent.  Patented June 14, 1921.

Application filed February 27, 1920. Serial No. 361,897.

*To all whom it may concern:*

Be it known that I, EMERY THOMPSON, a citizen of the United States, residing in the city of New Rochelle, State of New York, have invented a new and useful Improvement in an Ice-Cream Freezer, of which the following is a specification.

The object of the invention is to provide an improved liquid-measuring device, and more particularly means for automatically measuring batches of cream drawn from the mixing vat into the charging reservoir surmounting an ice-cream freezer, whereby the attendant is saved the time of waiting for the reservoir to fill and the duty of opening and closing an inlet valve, and whereby the batch is measured accurately irrespective of froth. The cream coming from the mixing vat is likely to be in a frothy condition, and this has made it difficult to gage by the eye with reference to a mark the amount admitted to the reservoir. It was necessary for the attendant to stand by and observe the filling of the reservoir, to close the inlet valve at the end of the cream pipe when he judged that enough had been admitted, and to open this valve again when a fresh batch was to be drawn from the pipe. By means of this invention all the operations are controlled by a single handle on the outlet valve through which the batch passes from the reservoir to the freezer, the entrance of cream to the reservoir is stopped automatically by the rising of a float when the requisite amount has entered, and the float is automatically supported when the outlet valve is opened, in such manner as to avoid cream entering the reservoir while it is discharging, the float being automatically released to refill the reservoir when the outlet valve is again closed.

In the accompanying drawings forming a part hereof and illustrating the preferred embodiment of the invention:

Figure 1 is a vertical longitudinal section through the reservoir, showing the cream pipe, outlet valves and other operating parts in elevation;

Fig. 2 is a plan view; and

Fig. 3 is a fragmentary view similar to Fig. 2, showing a changed position of the parts.

The drawing shows an ice-cream freezer reservoir 1. This reservoir is mounted over the freezer, and receives cream at one end from a cream pipe 2 leading from the mixing vat, not shown. The bottom of the reservoir slopes to the other end, where there is an outlet 3 from which the cream flows into the interior of the freezer. The outlet is opened and closed by a plug valve 4 turning on a vertical axis and having a projecting handle 5.

The outlet of the pipe 2 is opened and closed by a suitable cream valve 6 controlled by a float 7 on a lever 8 extending toward the front of the reservoir. This valve will be referred to as the inlet valve for the reservoir. Another manually-operated valve 9 in the pipe is closed when the freezer is not in use.

A vertical rock-shaft or upwardly extending member 10 is secured to the top of the handle 5 and therefore to the valve 4, with which it is coaxial. Said shaft extends upward through a bearing in a bracket 11 on the outside of the front wall of the reservoir, near the top, and has a crank-arm 12 on its upper end above the braket. To another bracket 13 on the inner side of the wall, opposite the bracket 11, is pivoted a float-support or swinging shelf 14. Said float-support turns on a vertical axis and has a crank-arm 15, and the two crank-arms are connected by a link 16 pivoted thereto at its ends. The part 14 coöperates with a finger or projection 17 on the float 7, the relations being such that when the outlet valve 4 is open the support is beneath the finger, while when said valve is closed the support is turned to one side, as shown in Fig. 3.

It will thus be seen that the float is sustained and released by a mechanically mounted support which is movable transversely in and out beneath the finger or projection by the movement of a turn-valve, and that the construction is such as to avoid leaving the float unsupported when the outlet valve is opened.

Assuming a batch of cream to have been discharged from the reservoir into the freezer and the float to be held up by the support 14, when the handle 5 is next turned to close the outlet valve 4 the float is released and falls, thereby opening the cream valve 6. Cream from the mixing vat flows into the reservoir until the predetermined amount has been admitted. Then the rising of the float causes the inlet valve to close. At this time the finger 17 is just above the level of the support 14, which is off at one side, so that the finger cleared it in rising. The attendant can now turn the handle in the opposite direction to open the outlet valve, at the same time automatically causing the support 14 to move beneath the finger, thereby sustaining the float and preventing more cream entering the reservoir while its measured contents are flowing into the freezer. There is no tendency to leave the float unsustained with the outlet valve partly open, and when said valve is closed the float is always free to descend as far as may be necessary to insure refilling. It will be understood that in the filling of the reservoir the float is governed by the true liquid level and is unaffected by froth on the surface.

What is claimed as new is:

1. The combination of a reservoir, an inlet valve, a float controlling said valve, an outlet turn-valve having a handle, a coaxial rock-shaft extending upward from said turn-valve, and float supporting and releasing means connected with the upper part of said shaft.

2. The combination of a reservoir, an inlet valve, a float controlling said valve, an outlet turn-valve having a handle, a coaxial rock-shaft extending upward from said turn-valve, a crank on the upper part of said shaft outside the reservoir, a pivoted float-support located interiorly and having a crank, and a link connecting said cranks.

3. The combination with a reservoir, an inlet valve, and a float controlling said valve and having a projection, of an outlet turn-valve having a handle, a mechanically mounted float support movable transversely in and out beneath said projection and operatively connected with the outlet valve, so that the support is moved inward beneath the projection when the outlet valve is opened, and outward to clear the projection when said valve is closed.

4. The combination with a reservoir, an inlet valve, and a float controlling said valve and having a projection, of an outlet valve, a mechanically mounted float support movable transversely in and out beneath said projection and operatively connected with the outlet valve, so that the support is moved inward beneath the projection when the outlet valve is opened, and outward to clear the projection when said valve is closed.

5. The combination with a reservoir, an inlet valve, and a float controlling said valve, of an outlet turn-valve outside the reservoir, a member extending upward from said turn-valve, a mechanically mounted movable support for the float within the reservoir, and an operating connection between said member and float-support.

EMERY THOMPSON.